(12) United States Patent
Soleri

(10) Patent No.: US 6,761,016 B1
(45) Date of Patent: Jul. 13, 2004

(54) HIGH SPEED FORM, FILL AND SEAL POUCH PACKAGING MACHINE

(76) Inventor: Richard A. Soleri, 1734 Drumcliff Ct., Westlake Village, CA (US) 91361

( * ) Notice: Subject to any disclaimer, the term of this patent is extended or adjusted under 35 U.S.C. 154(b) by 0 days.

(21) Appl. No.: 10/231,599

(22) Filed: Aug. 30, 2002

(51) Int. Cl.[7] .............................. B65B 9/02; B65B 9/20
(52) U.S. Cl. .......................................... 53/554; 53/552
(58) Field of Search .......................... 53/551, 554, 552, 53/553, 555

(56) References Cited

U.S. PATENT DOCUMENTS

| | | | | |
|---|---|---|---|---|
| 2,336,962 A | * | 12/1943 | Salfisberg ...................... | 53/554 |
| 3,451,187 A | * | 6/1969 | Massey et al. ................. | 53/451 |
| 3,543,477 A | * | 12/1970 | Leasure ......................... | 53/551 |
| 3,641,737 A | * | 2/1972 | Tamagni ........................ | 53/554 |
| 4,117,647 A | * | 10/1978 | Rossi ............................ | 53/551 |
| 4,845,926 A | * | 7/1989 | Davis ............................ | 53/554 |
| 5,199,245 A | * | 4/1993 | Daddario et al. .............. | 53/551 |
| 5,408,807 A | * | 4/1995 | Lane et al. ..................... | 53/554 |
| 5,460,844 A | * | 10/1995 | Gaylor .......................... | 53/554 |
| 5,753,067 A | * | 5/1998 | Fukuda et al. ................. | 53/451 |
| 5,794,776 A | * | 8/1998 | Corella ......................... | 53/554 |
| 6,138,442 A | * | 10/2000 | Howard et al. ................ | 53/551 |
| 6,598,377 B2 | * | 7/2003 | Takahashi ..................... | 53/551 |

* cited by examiner

Primary Examiner—John Sipos
(74) Attorney, Agent, or Firm—James G O'Neill, Klein, O'Neill & Singh, LLP

(57) ABSTRACT

A high speed vertical form, fill and seal packaging machine has a dual pump pouch-filling system, adjustable packaging material roll holders and side-seal jaws that are longer than pouches being formed in the machine, and which move with the packaging material traveling through the machine. Packaging material is moved in a semi-continuous manner and has side seals formed therein that are slit by a slitter system and pulled downwardly by a multi-jaw, rotary cross-seal system. After being completed, the formed pouches are cut off by a reciprocating or rotary cut-off system.

24 Claims, 5 Drawing Sheets

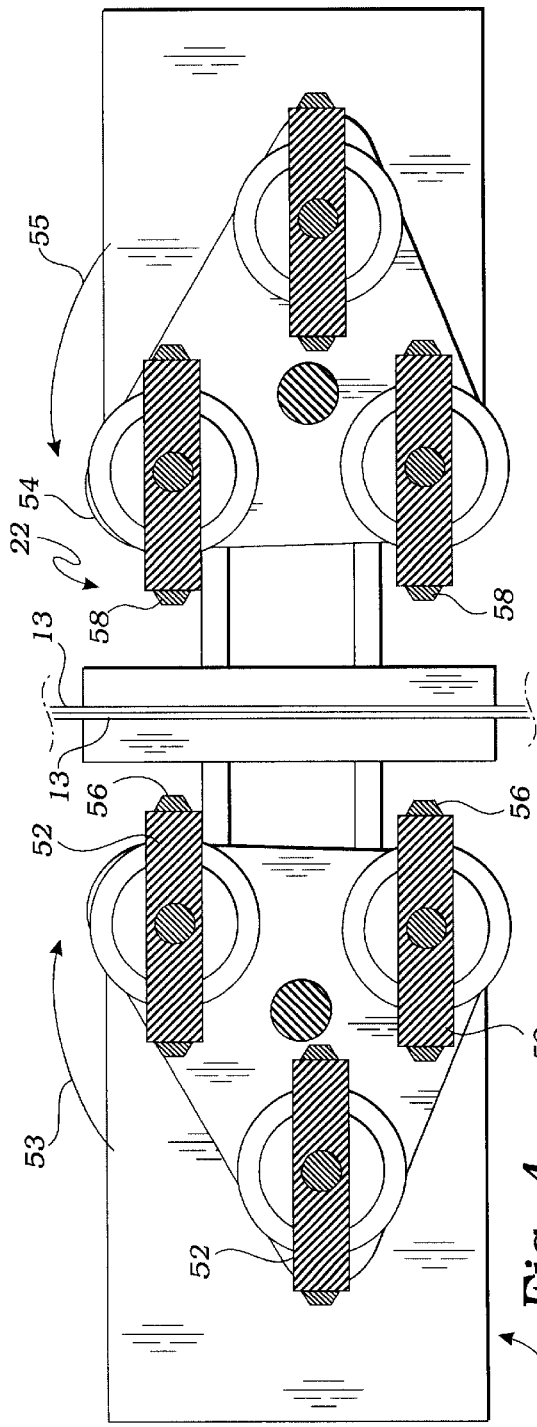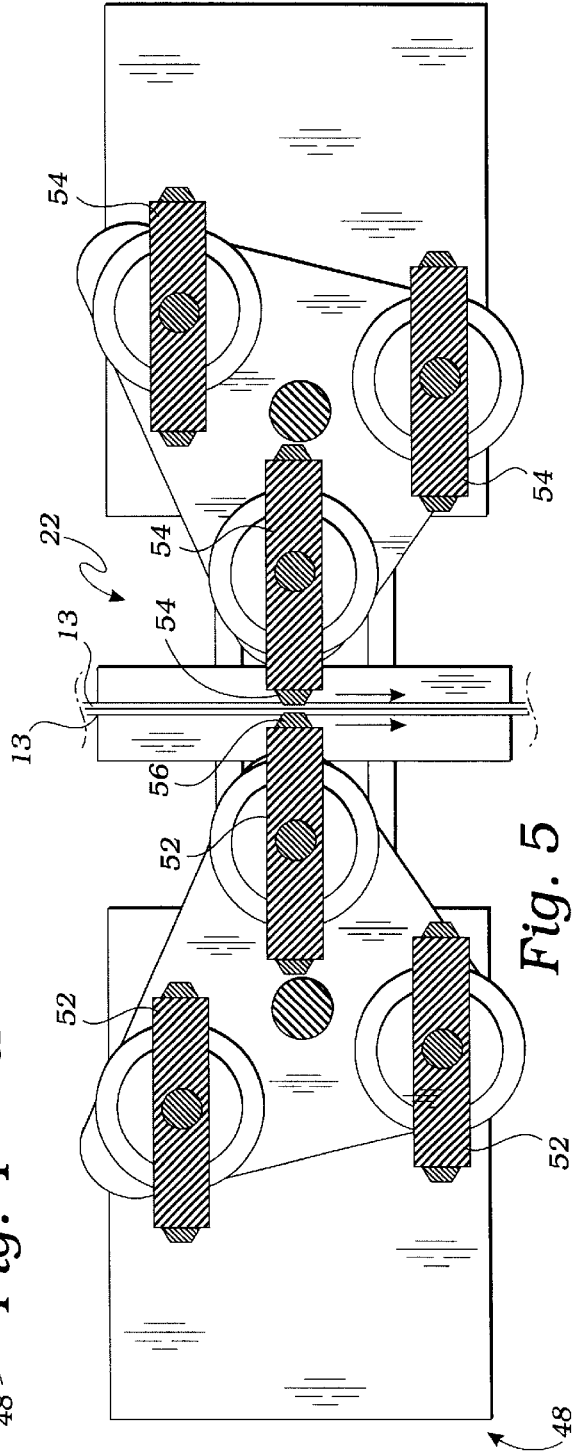

HIGH SPEED FORM, FILL AND SEAL POUCH PACKAGING MACHINE

BACKGROUND OF THE INVENTION

1. Field of the Invention

This invention generally relates to packaging machines for forming, filling and sealing flexible pouches and, more particularly, to an improved high speed packaging machine that approximately doubles the production rate of existing machines.

2. Description of the Prior Art

Because of the technical advances in film pouch forming, filling and sealing machines, more and more food and related products, in various states are being packaged in flexible film pouches for ease in shipping, handling and dispensing of such products at a point of use. Known machines to form, fill and seal such pouches usually utilize continuous rolls of heat sealable plastic film, and pouches are generally horizontally or vertically formed in continuous strips from the rolls of plastic film, filled with product, sealed, and then cut off.

To form pouches on these known form, fill and seal packaging machines, side seals or seams are normally formed between front and back films by heated side-seal forming means and the machine indexed so that cross-seal forming means form the bottom seals or seams. These three-sided pouches are then filled with product and the machine indexed to forward the filled pouches.

The same cross seal forming means is then utilized to form the top seam or seams on the filled pouches. At the same time, it forms the bottom seam or seams on the next partially formed but still empty pouches. The formed pouches are then severed from the moving streams of front and back heat sealable films and discharged from the machine. The machine is again indexed and the cycle continues.

The side seams or seals of the pouches are normally formed at one station by side seal forming means, while the cross seams or seals are formed at a second station by reciprocating or rotary front and back seal bars which come together to join front and back rolls of material by heat and pressure. The combination of heat and pressure at both stations form cross and side seals between the films to create the various pouch seams.

The typical form, fill and seal packaging machine is capable of concurrently forming a linear array of side by side pouches across the width of the machine. The number of side by side pouches concurrently formed can vary from a single pouch, when large, wide pouches are being formed, up to a large number of narrow pouches, depending on the limits of the machine size and material(s) being used. The various means to cut and form such pouches usually extend across the width of the material being formed, filled and sealed in the machine.

The final size of pouches formed on a pouch packaging machine are usually determined by the amount and type of contents to be held in the pouches and how the contents will be dispensed from the pouches. Thus, the geometry of a pouch is highly dependent upon what the pouch will ultimately contain, as well as how and where its contents are to be dispensed.

The known pouch packaging machines have numerous drawbacks or problems, including, but not limited to, cost to produce and speed of operation. Such known pouch packaging machines use pull wheels to index the pouches being formed, and such machines are limited in speed because of slippage of the pull wheels due to wear and the need to start and stop the machine during the various operations performed therein.

Although rotary devices are known to form side and cross seals, they normally contain rotating front and back seal bars that only touch the pouch making material momentarily. Therefore, these known rotary sealing devices do not always form dependable or integral seals. In particular, when packaging liquid products, rotary devices usually do not have enough "dwell" (time (time seals are pressed against material) to form an adequate and integral seal for liquid products.

Furthermore, with the current global concerns over environmental and safety issues, such as, sanitation in the delivery, storage and handling of food products, the need to cut down on waste and to save energy, a high speed machine having the same footprint as known machines offers a simple and elegant solution to many concerns.

Therefore, there exists a need in the packaging and dispensing art for a high speed, sanitary pouch packaging machine for use in packaging various liquid and dry products, which pouch packaging machine overcomes the known problems and can be used to produce high quality pouches containing dry or liquid products at high speed, without increasing the size of the machine.

SUMMARY OF THE INVENTION

Accordingly, it is a general object of the present invention to provide an improved form, fill and seal packaging machine. It is a more particular object of the present invention to provide a high speed form, fill and seal packaging machine. It is a further object of the present invention to provide a novel form, fill and seal packaging machine having a reciprocating and sliding, side-sealing system. It is yet another object of the present invention to provide a novel traveling cross-sealing means for a vertical form, fill and seal packaging machine. It is a still further object of the present invention to provide a novel rotary cross-seal system for a form, fill and seal packaging machine. It is yet a still further object of the present invention to provide a novel high speed vertical form, fill and seal packaging machine having a semi-continuous motion to form pouches in an expeditious manner. And, it is still a further object of the present invention to provide an improved form, fill and seal packaging machine having a dual product-filling system that works in combination with a reciprocating and slidable side-seal system and a rotary multi-jaw, cross-seal system to form pouches at a substantially increased production rate.

In accordance with one aspect of the present invention there is provided a high speed form, fill and seal packaging machine having a reciprocating and sliding side-seal jaw system, a multi-jaw traveling cross-seal system, a reciprocating and/or rotary cut-off knife system, and a multi-product pump pouch-filling system.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIGS. 4 and 5 are schematic cross-sectional views of the multi-jaw rotary cross-seal system of FIG. 3.

DESCRIPTION OF THE PREFERRED EMBODIMENTS

Figure 1:
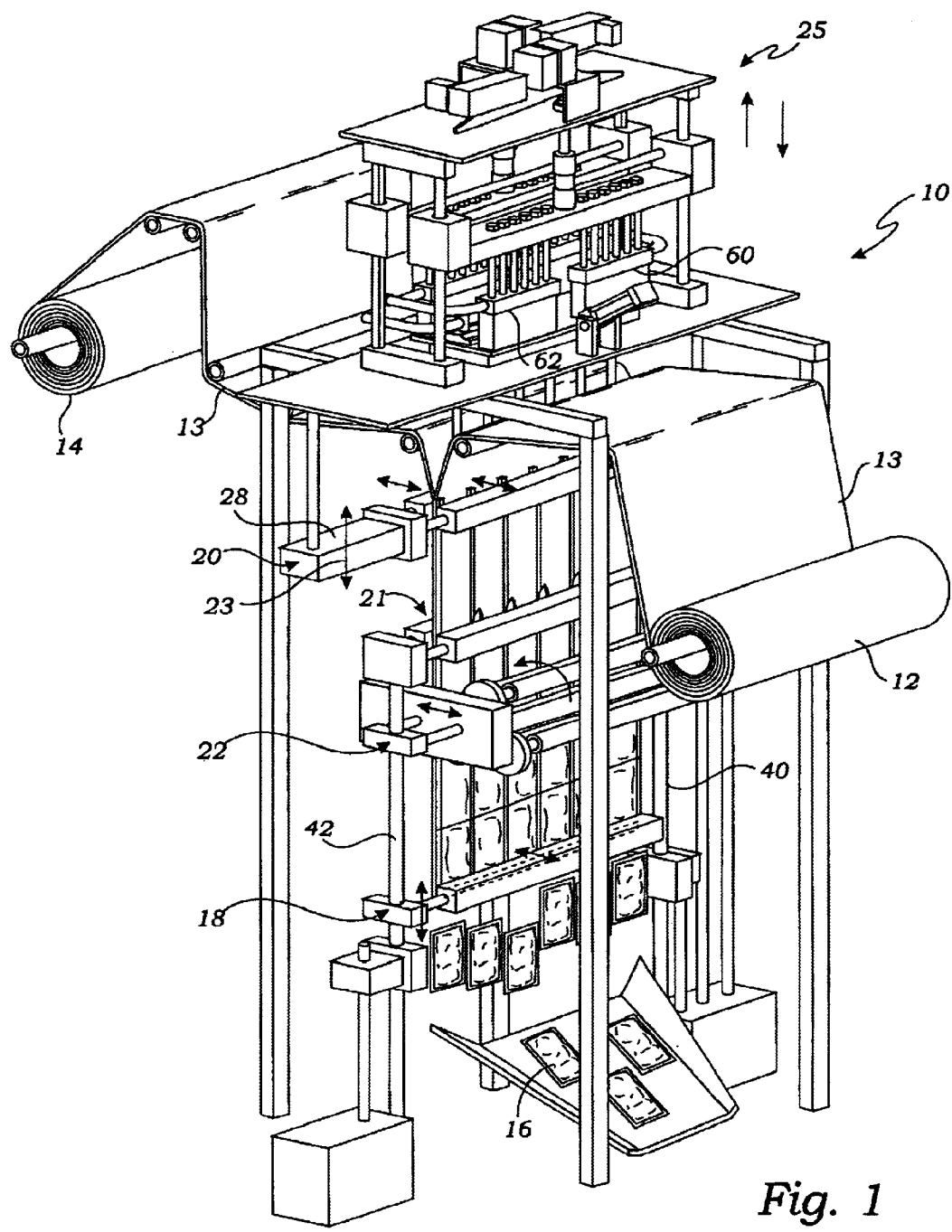
FIG. 1 is a schematic perspective view of a form, fill and seal packaging machine of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a novel and improved high speed form, fill and seal packaging machine.

The machine of the present invention, generally indicated at 10, is a "semi-continuous" motion high speed multi-lane vertical form/fill/seal packaging machine, for liquid and dry products, capable of approximately doubling the production rates of known machinery. The machine of the present invention accomplishes this while still maintaining seal integrity and without sacrificing heat seal "dwell" time. Additionally, the machine of the present invention utilizes the normal "stop" cycle on current indexing pouch packaging machines to create what may be termed another machine cycle, thus greatly improving the production rate of the machine. Furthermore, the high speed machine of the present invention provides improved results without increasing the physical speed of the mechanical components of the machine and without increasing the machine "foot print." Finally, the present invention accomplishes all of the above while reducing machine maintenance and spare parts cost.

As used herein, the term "semi-continuous" motion describes the packaging material movement through each station of the packaging machine 10. This is not a "true" continuous-motion machine because of the design of the multi-jaw traveling rotary cross seal system; which system pulls the film and pouches being made through the machine. There is an interruption in the movement of the film to allow the cross seals to return to their start position and the next set of cross-seal jaws to make contact with the film. The side-seal system has a mechanical stroke (maximum pouch length) during sealing that is slightly longer than the actual pouch length being produced on the machine. The photo-electric system which reads the registration marks on packaging film (which determines actual pouch length) will interrupt the cross seal pull cycle. This registration system will release the side seal system slightly before the rotary cross seal. Since the rotary cross seal dimensions are fixed to create the longest pouch and since shorter pouches will be normally produced, the rotary cross seal jaw system will have to make up the difference (recovery or return to start position) before the next pouch can be formed. This will cause a slight hesitation in film movement, thereby creating the "semi-continuous" motion.

The high speed machine of the present invention has the following advantages:

High speed—production rates to 150 cycles/min.

Reciprocating and sliding side-seal jaw system that follows (moves with) the packaging material to maintain side-seal "dwell" time during the semi-continuous motion.

A multi-jaw traveling rotary cross-seal system that pulls the packaging material to maintain seal "dwell" time during the semi-continuous motion.

A reciprocating and/or rotary cut-off knife system.

Plural product pouch-filling system that operates alternately to allow semi-continuous motion operation.

Hinged, "swing open" side-seal jaw assembly to allow easy access for taping, heater changes and general service.

Automatic positioning of cross-seal jaw assembly for taping, heater changes and general service.

Retractable blade/hinged slitter system in which blades are retracted for machine servicing. Also, entire slitter system hinges to move out of the way.

Servo-controlled motion system.

If filling liquid pouches, a CIP (clean-in-place) dual product pump system that reduces cleaning time and service. Also, automatically positions pistons for "O" ring changes.

Inclined base and top plates for improved sanitation and reduced product accumulation.

Reduced service and maintenance requirement because there are fewer mechanical components.

Reduced spare parts cost.

Eliminates the need to utilize pull wheels.

Run-mode and stop-mode jaw positioning—side-sealing jaws move away from the film during the "stop" or return to start position mode reducing heat transfer. Side-sealing jaws move closer together during the operating or "run" mode to maximize cycle speed.

Figure 6:
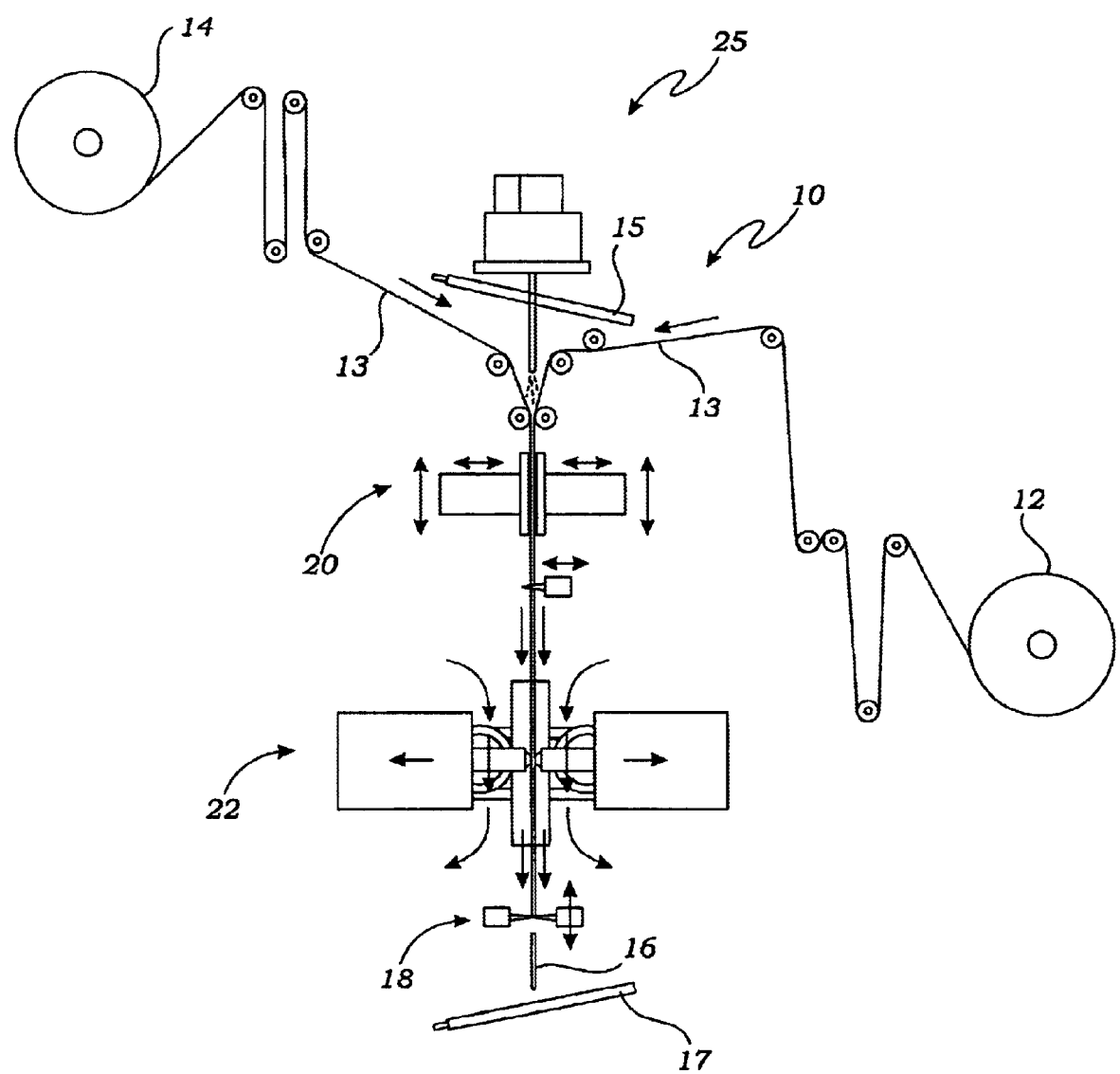
FIG. 6 is a schematic side-elevational view of the packaging machine of FIG. 1.

Turning now to the drawings, there shown is the improved and novel form, fill and seal, vertical packaging machine 10 of the present invention. Machine 10 uses a pair of rolls 12, 14 of heat-sealable plastic film or packaging material 13 mounted at the top of the machine, preferably in some type of web-guide control system. The film 13 comes in a variety of widths and travels downwardly (vertically) through the machine 10, from a slanted top 15 toward a slanted bottom 17 (see FIG. 6), to simultaneously form, fill and seal pouches 16, in a plurality of streams. The finally-formed pouches 16, which may hold any of a variety of dry or liquid products for use elsewhere, are then cut off from upper, partially-formed pouches 16 at the end of their vertical or downward travel through the machine, by a cut-off means 18.

Basically, as shown, the pouches are formed, filled and sealed by utilizing a reciprocating and slidable side-seal jaw system 20 that moves against the two sheets of film 13 to form side seals. The side-seal jaw system 20 moves downwardly with the films 13, in the direction of arrow 23, a predetermined distance in the machine. A slitter system 21 is mounted in the machine, preferably below the side-seal jaw system, and above a multi-jaw traveling, preferably rotary, cross-seal system 22. Finally, the cut-off system 18, which cut-off system may be reciprocating or rotary, is mounted below the multi-jaw cross-seal system 22. A novel dual product pump system 23 is used to fill the product packages formed in the machine 10 during alternate cycles.

Each of the systems 18, 20, 21, 22 and 23 may take a number of configurations. However, currently preferred embodiments of each, are described below.

For example, the side seal system 20 may be a single or a double jaw system. A single jaw system is shown at 20 in FIGS. 1, 2 and 5 and includes a housing 19 having a plurality of front and rear, reciprocating vertical side-seal elements or jaws 24, 26, which side-seal elements or jaws are heated in a known manner. The seal elements 24, 26 are preferably sized and dimensioned to be approximately double the length of pouches 16 to be formed therein, and include an operating means 28. The operating means 28 may take any desired form, such as a servo system operating a mechanical, hydraulic or pneumatically operated linkage system having a plurality of linkage means.

Figure 2:
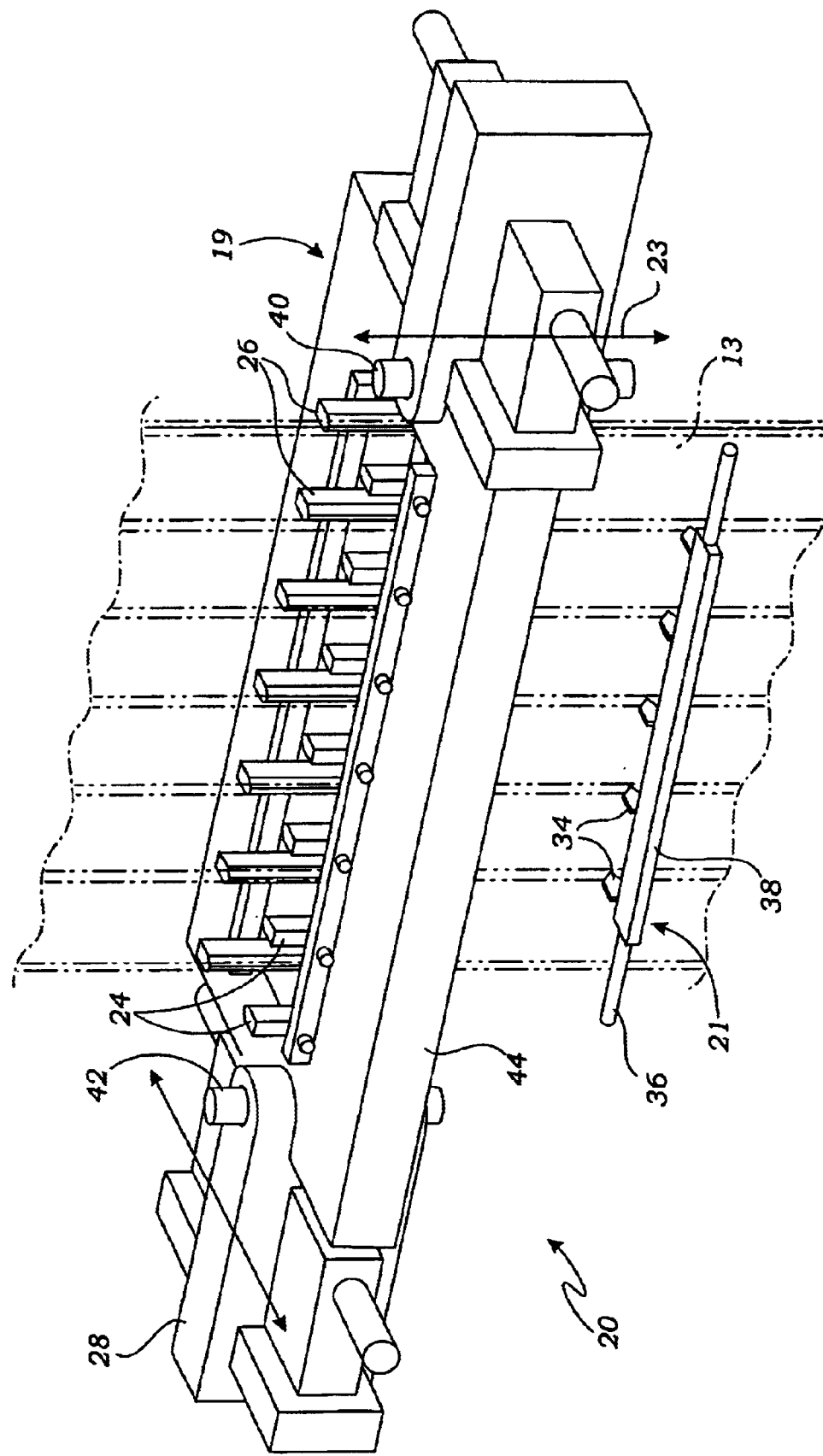
FIG. 2 is a partial schematic perspective view of a reciprocating and sliding side-seal assembly and material-slitting system in accordance with the present invention.

The side-seal system 20 housing 19 is movably mounted on a pair of shafts 40, 42 vertically held in the machine and slidably movable with pouches 16 being formed therein, in the direction of arrow 23, a predetermined distance, as explained more fully below, and shown in FIG. 2.

Additionally, the front or outside portion of the side-seal system is preferably formed as a hinged front jaw 44, to allow easy access for service and maintenance, as by removal of a securing element (not shown).

The side-seal elements 24, 26 are locked under pressure to seal the front and back webs 13 together to create sides of the pouches 16. These side-seal elements 24, 26 move downwardly with the pouches 16 being formed during every other cycle of the machine, a predetermined distance, depending on the size of pouches being formed. As stated above, each of the side-seal elements 24, 26 is approximately, or more than double, the length of the pouches being formed to enable side seals to be formed thereon while the side-seal elements move downwardly with the pouches. The entire jaw system 20 moves downwardly, by operation of the operating system 28, in the direction of arrow 23, approximately one (1) pouch length in unison with the operation of the rotary cross-seal system 22 during the run cycle. The seal elements 24, 26 in the jaw system 20 then open and are returned upwardly to their starting position, during the return or stop cycle.

The rotary cross-seal system 22 forms the cross seals while pulling the films 13 forming the set of pouches 16 downwardly to form a further set of pouches. As explained, during this return or "stop" cycle, the side-seal elements 24, 26 only open wide enough to allow the side-seal elements to return to their start position without touching the film 13. However, when the machine 10 is "off", the side-seal elements open further, or wide enough to keep heat away from the film.

If a double jaw system 20 is used, pairs of jaws containing side seals will be vertically spaced apart in the machine 10 and sequentially operated to form pouches 16. One pair of side-seal jaws would follow the web of material 13 down, while the other pair of jaws would remain open while moving in the opposite direction and in a fixed position. Each of the pairs of side-seal jaws will alternate opening and closing, with only the closed pairs moving downwardly one (1) pouch length with the operation of the rotary cross-seal system 22 to form cross seals.

Figure 3:
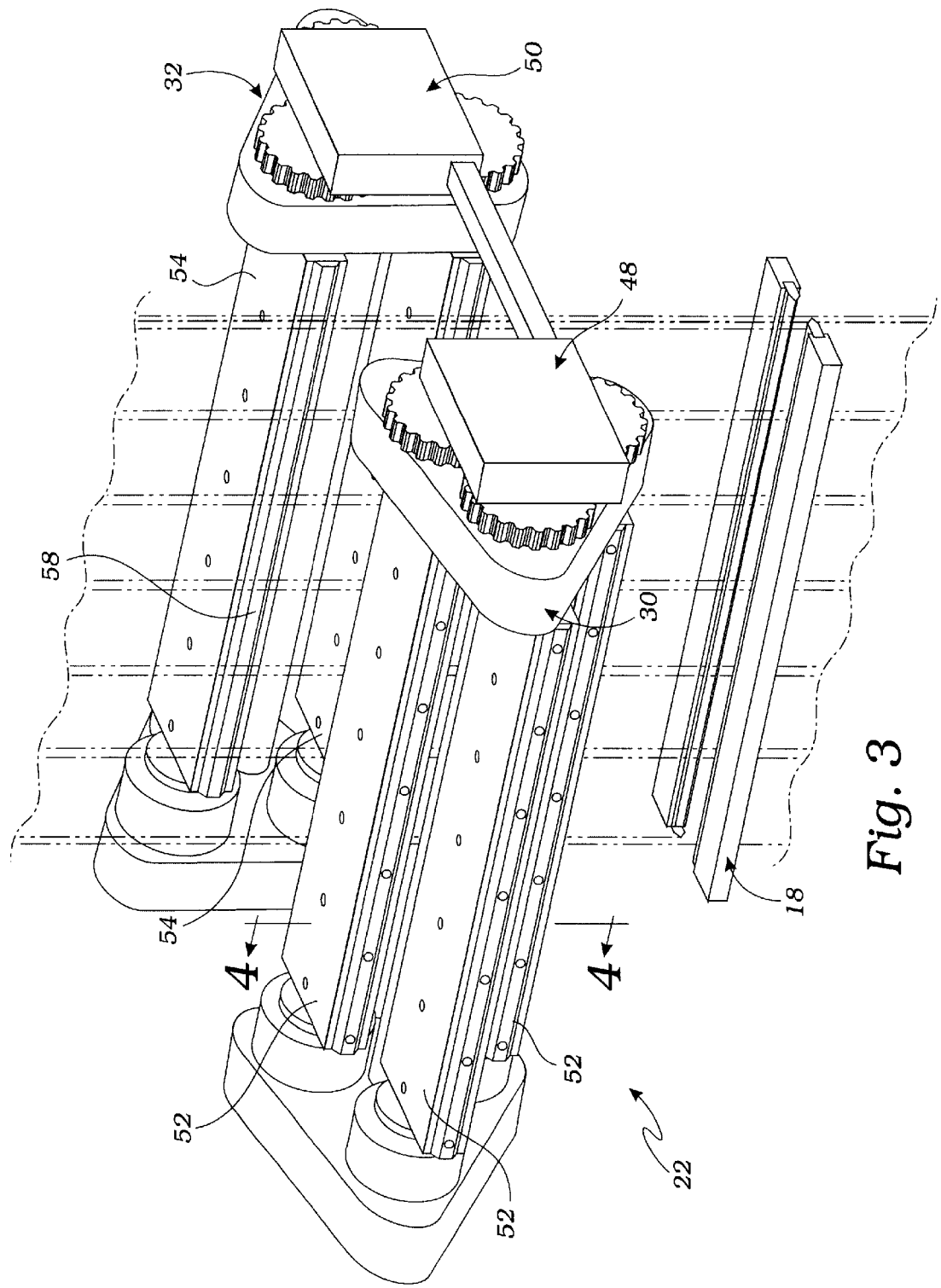
FIG. 3 is a partial perspective view of a multi-jaw rotary cross-seal system and a reciprocating cut-off system.

As best shown in FIGS. 3–5, the rotary cross-seal system 22 includes a pair of jaws 48, 50, each of which has a plurality of cross-seal elements 52, 54 therein. Each of the pair of jaws has the cross-seal elements driven or rotated therein by an actuating system 30,32, such as belt or gear drive means, or a combination thereof, operated by servos to simultaneously rotate all of the cross-seal elements 52, 54 in the direction of arrows 53, 55 (see FIG. 4) so that sealing faces 56, 58 on each cross-seal element sequentially come together against the films 13 to form the cross seals in the pouches 16. To ensure sufficient dwell time, and to intermittently pull the films 13 through the machine 10, the sealing faces 56, 58 come into contact with, and are held in contact with the packaging material for as long as possible while the cross-seal elements 52, 54 are being rotated.

Although three rotary cross-seal elements 52, 54 are shown in each jaw 48, 50, it is to be understood that, depending on the pouches being made, at least 2 cross-seal elements should be used in some circumstances and that more than 3 could be used.

The slitter system 21, although shown between the side-sealing and cross-sealing systems, could be mounted in any convenient location on the machine 10. The slitter system preferably includes a plurality of blades or knives 34 secured on a rotary shaft 36. The shaft 36 is operated by a pneumatic rotary actuator or other known system to rotate the blades 34 between a blade guard system or housing 38 and the packaging material.

An example of the dual pouch-filling system 25 is best shown in FIG. 1. For filling liquid products into pouches, the system would use a pair of pumps 60, 62, which pumps are preferably piston pumps of the type generally used in the food industry. These pumps are alternately independently operated, and approximately 160° to 180° apart, so as to send liquid product to a common manifold for faster distribution of the product into the pouches 16 being formed. The pumps 60, 62 are operated by servos in unison with the operation of the side-seal and cross-seal assemblies.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A high speed pouch packaging machine comprising:
   a main frame having a top and a base;
   at least one packaging material holder mounted at the top of the main frame to feed the material vertically downward into the machine;
   a side seal system comprised of a plurality of front and rear reciprocating side seal elements; the side seal system being vertically movable with respect to the main frame when contacting and forming side seals on packaging material moving through the machine, toward the base;
   a pair of cross seal jaws reciprocally mounted in the main frame, after the side seal system; each of the cross-seal jaws having a plurality of cross seal elements rotatably mounted therein; a system for rotating the cross seal elements the rotatable cross seal elements being operated in unison with the vertically movable side seal system in a semi-continuous manner, toward the base, so as to contact and pull packaging material through the machine while forming cross seals on the packaging material;
   an operating system for moving the plurality of elongated, heated, reciprocating side seal elements and the pair of cross seal jaws horizontally and downwardly in unison to seal the packing material while pulling the packing material downwardly in a semi-continuous motion;
   a pouch cut-off system; and
   a dual product filling system, operable in unison with the vertically movable side-seal system and the rotatable side seal elements.

2. The high speed pouch packaging machine of claim 1 wherein the plurality of reciprocating side-seal elements are held in housings slidably mounted on a pair of vertical rods held in the main frame, and each of the side-seal elements is substantially longer than pouches to be made in the high speed pouch packaging machine.

3. The high speed pouch packaging machine of claim 2, further including control means for operating the side-seal system, the film-slitting system, the pair of cross seal jaws, the pouch cut-off system and the dual product-filling system.

4. The high speed pouch packaging machine of claim 3 wherein the pair of cross seal jaws are mounted in a pair of opposed, reciprocating frames, and each of the reciprocating frames includes at least two rotary cross-seal elements.

5. The high speed pouch packaging machine of claim 4 wherein the dual product-filling system includes a pair of pumps that are alternately operated.

6. The high speed pouch packaging machine of claim 5 wherein the pouch cut-off system includes rotary cut-off knives.

7. The high speed pouch packaging machine of claim 5 wherein the pouch cut-off system includes reciprocating cut-off knives.

8. The high speed pouch packaging machine of claim 5 wherein the film-slitting system includes a plurality of blades held on a rod, which plurality of blades are rotatable into and out of a blade guard system.

9. The high speed pouch packaging machine of claim 1, further including an operating system for operating the high speed pouch packaging machine in the semi-continuous motion.

10. The high speed pouch packaging machine of claim 9 wherein the plurality of rotary cross seal elements pull packaging material a predetermined distance through the main frame while maintaining contact with the packaging material to form integral cross seals.

11. The high speed pouch packaging machine of claim 10 wherein the pair of cross seal jaws are mounted in a pair of opposed, reciprocating frames, and each of the reciprocating frames includes at least two rotary cross-seal elements.

12. The high speed pouch packaging machine of claim 11 wherein the plurality of reciprocating side-seal elements are held in housings slidably mounted on a pair of vertical rods held in the main frame, and each of the side-seal elements is substantially longer than a pouch to be made in the high speed pouch packaging machine.

13. The high speed pouch packaging machine of claim 12 wherein the film-slitting system includes a plurality of blades held on a rod, which plurality of blades are rotatable into and out of a blade guard system.

14. The high speed pouch packaging machine of claim 13 wherein the pouch cut-off system includes rotary cut-off knives.

15. The high speed pouch packaging machine of claim 13 wherein the pouch cut-off system includes reciprocating cut-off knives.

16. A high speed vertical pouch packaging machine, comprising:
  a main frame having an inclined base plate and an inclined top plate;
  a dual product-filling system mounted in the main frame, above the top plate for alternately filling partially-formed pouches in the machine;
  a pair of packaging material holders held on the main frame to feed two streams of packaging material vertical downward into the machine;
  a plurality of elongated, heated, reciprocating side-seal elements sized and dimensioned to be longer than pouches being formed in the machine; the plurality of elongated, heated reciprocating side-seal elements being held in housings reciprocally and slidably mounted in the main frame, below the inclined top plate, to form side seals on the two streams of packaging material while traveling downwardly with the packaging material toward the inclined base plate;
  a packaging material slitting system held in the main frame below the plurality of heated, reciprocating side-seal elements to slit the two streams of sealed-together packaging material into a plurality of strips of partially-formed pouches;
  a pair of cross seal jaws; each of the cross seal jaws having a plurality of cross-seal elements rotatably mounted in reciprocating frames held in the main frame below the packaging material slitting system to form cross seals on the plurality of strips of partially-formed pouches and a system for rotating the cross seal elements
  an operating system for moving the plurality of elongated, heated, reciprocating side seal elements and the pair of cross seal jaws horizontally and downwardly in unison to seal the packing material while pulling the packing material downwardly in a semi-continuous motion; and
  a pouch cut-off system held in the main frame between the plurality of cross-seal elements and the inclined base plate to cut-off filled and sealed pouches.

17. The high speed pouch packaging machine of claim 16 wherein the plurality of rotary cross seal elements are mounted in a pair of opposed, reciprocating frames, and each of the reciprocating frames includes at least two rotary cross-seal elements.

18. A high speed vertical pouch packaging machine, comprising:
  a main frame having an inclined base plate and an inclined top plate;
  a dual product-filling system mounted above the inclined top plate;
  a pair of holders for rolls of packaging material mounted on the main frame to feed material vertically downward into the machine;
  a side seal system having a plurality of elongated, heated, reciprocating side-seal elements, sized and dimensioned to be longer than pouches being formed in the machine, held in housings slidingly held on rods held in the main frame, below the inclined top plate to allow the side seal elements to press against and travel with packaging material moving downwardly through the machine, toward the inclined base plate;
  a slitting mechanism;
  a pair of cross seal jaws having a plurality of rotary cross-seal elements in each jaw for cross-sealing and pulling pouches made from the packaging material through the machine in a semi-continuous motion in unison with the traveling side seal elements; and
  a system for rotating the cross seal elements;
  an operating system for moving the plurality of elongated, heated, reciprocating side seal elements and the pair of cross seal jaws horizontally and downwardly in unison to seal the packing material while pulling the packing material downwardly in a semi-continuous motion; and
  a pouch cut-off system.

19. The high speed pouch packaging machine of claim 18, further including an operating system having a plurality of servos therein for operating the high speed pouch packaging machine in a the semi-continuous motion, during which the dual product filling system, the side seal system and the pair of cross seal jaws are operated in unison.

20. The high speed pouch packaging machine of claim 19 wherein the plurality of rotary cross-seal elements are mounted in a pair of opposed, reciprocating frames, and each of the reciprocating frames includes at least two rotary cross-seal elements therein.

21. The high speed pouch packaging machine of claim 20 wherein the dual product-filling system includes a pair of pumps that are alternately operated.

22. The high speed pouch packaging machine of claim 21 wherein the pouch cut-off system includes rotary cut-off knives.

23. The high speed pouch packaging machine of claim 22, wherein the pouch cut-off system includes reciprocating cut-off knives.

24. The high speed pouch packaging machine of claim 22 wherein the film-slitting system includes a plurality of blades held on a rod, which plurality of blades are rotatable into and out of a blade guard system.

* * * * *